United States Patent [19]

Finberg

[11] 4,123,417
[45] Oct. 31, 1978

[54] LOW DENSITY POLYETHYLENE TOUGHENED WITH ETHYLENE/PROPYLENE COPOLYMER

[75] Inventor: Arne O. Finberg, Edison, N.J.

[73] Assignee: Mobil Oil Corporation, New York, N.Y.

[21] Appl. No.: 713,767

[22] Filed: Aug. 12, 1976

Related U.S. Application Data

[63] Continuation of Ser. No. 513,680, Oct. 10, 1974, abandoned.

[51] Int. Cl.² ............................................. C08L 23/16
[52] U.S. Cl. .............................. 260/42.46; 260/897 A
[58] Field of Search ......................... 260/897 A, 42.46

[56] References Cited

U.S. PATENT DOCUMENTS

| 3,157,614 | 11/1964 | Fischer | 260/42.46 |
| 3,261,889 | 7/1966 | Van't Wout | 260/897 |
| 3,299,194 | 1/1967 | Golike | 264/210 |
| 3,592,881 | 7/1971 | Ostapchenko | 260/897 |

FOREIGN PATENT DOCUMENTS

| 789,074 | 7/1968 | Canada | 260/897 |
| 997,819 | 7/1965 | United Kingdom | 260/897 |

Primary Examiner—Carman J. Seccuro
Attorney, Agent, or Firm—Hastings S. Trigg; Charles A. Huggett

[57] ABSTRACT

The toughness of low density polyethylene film is increased by incorporating therein a small amount of an ethylene-propylene copolymer containing between about 65 and about 85 percent ethylene and having between about 1 percent and about 20 percent crystallinity. When the film is to be subjected to relatively high temperature storage, as in a warehouse, blocking is avoided by the addition of between about 0.5 and about 5 weight percent finely-divided filler. Seal performance of low density polyethylene film was significantly improved by incorporating the ethylenepropylene copolymer.

5 Claims, 2 Drawing Figures

LOW DENSITY POLYETHYLENE TOUGHENED WITH ETHYLENE/PROPYLENE COPOLYMER

This is a continuation of application Ser. No. 513,680, filed Oct. 10, 1974, now abandoned.

BACKGROUND OF THE INVENTION

1. Field of the Invention

This invention is concerned with blends of polymers and with tough films made from them.

2. Description of the Prior Art

It has been proposed to incorporate amorphous elastomers into various polymers, such as high density polyethylene, polypropylene, polystyrene, and polyvinyl chloride to increase toughness. In U.S. Pat. No. 3,261,889, it is disclosed that the incorporation of amorphous ethylene-propylene copolymer into low density polyethylene (LDPE) will increase environmental stress cracking resistance in wire coating applications.

It is the discovery of this invention, however, that amorphous ethylene-propylene copolymers will not increase the toughness of LDPE. In order to increase toughness of LDPE, an ethylene-propylene copolymer must have a certain amount of crystallinity and a specified ethylene content.

SUMMARY OF THE INVENTION

This invention provides blends, and films made therefrom, comprising low density polyethylene containing, by weight of the blend, between about 0.5 percent and about 10 percent of an ethylene-propylene copolymer having an ethylene content of between about 65 weight percent and about 85 weight percent and a crystallinity of between about 1 percent and about 20 percent.

It also provides blends for making films resistant to blocking under high temperature storage conditions, comprising polyethylene containing, by weight of the blend, between about 0.5 percent and about 10 percent of an ethylene-propylene copolymer having an ethylene content of between about 65 weight percent and about 85 weight percent and having a crystallinity of between about 1 percent and about 20 percent, and between about 0.5 percent and about 5 percent of finely-divided inorganic fillers, such as talc, calcium silicates, silica, Ca, Mg, carbonates, clays, silicates, Ca, Mg oxides, carbon black, graphite and others.

DESCRIPTION OF SPECIFIC EMBODIMENTS

Figure 1:
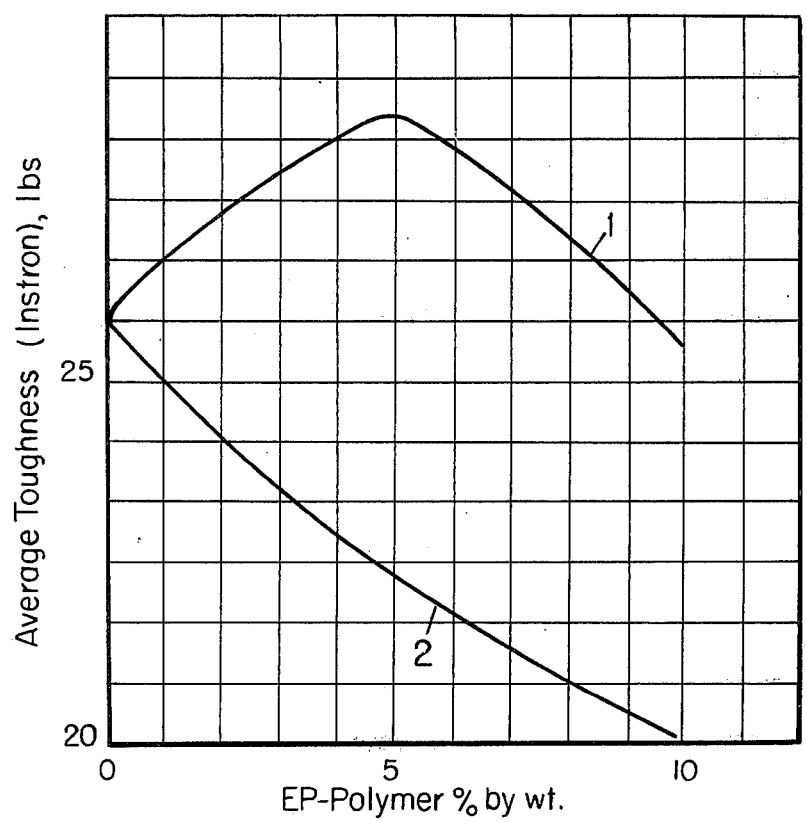
FIG. 1 presents a curve showing the relationship between the average Instron toughness and the concentration in LDPE of a partially crystalline ethylene-propylene copolymer and a comparative curve showing the relationship between Instron toughness and the concentration in LDPE of an amorphous ethylene-propylene copolymer.

The low density polyethylene (LDPE) component utilizable herein is made by the so-called high pressure method and has a density from about 0.910 to about 0.925. LDPE is available commercially.

The ethylene-propylene copolymer (EPM) utilizable in the LDPE blends of this invention contain between about 65 weight percent and about 85 weight percent ethylene. In accordance with the discovery of this invention, the EPM, although elastomeric, must have a small amount of crystallinity, in order to improve the toughness of the LDPE. The amount of crystallinity will be between about 1 percent and about 20 percent. A completely amorphous ethylene-propylene copolymer has been found ineffective to improve toughness of LDPE.

The manner by which the EPM is prepared is not an essential element of this invention, so long as it has the ethylene content and the crystallinity as aforedescribed. In general, it can be prepared by copolymerizing ethylene and propylene in the presence of a Ziegler-Natta catalyst using techniques well known in the art. A Ziegler-Natta catalyst is comprised of a combination of (A) a compound of a metal of Groups IV-A, V-A, VI-A, and VIII of Periodic Arrangement of the Elements [Journal of Chemical Education, volume 16, page 409(1939] and (B) an organometallic compound of Groups II and III of the Periodic Arrangement of the Elements. A typical catalyst is a combination of vanadyl acetylacetonate and an aluminum alkyl, such as diethylaluminum chloride.

In order to improve the toughness of LDPE, it has been found that small amounts of EPM can be added thereto provided that the EPM has an ethylene content of 65–85 weight percent and a crystallinity of 1–20 percent. This will be evident from the following examples.

EXAMPLE 1

Blends were made of LDPE and two different types of EPM, one completely amorphous and the others having a small amount of crystallinity. The properties of each EPM used are set forth in Table I. The blends were made containing 5 weight percent and 10 weight percent of each EPM and made into films by the well known technique of extruding a blown film. All films were prepared under identical conditions at a thickness of 1.4–1.5 mils. The films so prepared were subjected to tensile testing in accordance with ASTM Designation D638-72. The tensile properties of each film compared with the LDPE are set forth in Table 2. The LDPE used had a density of 0.919 and a M.I. (E) of 2.2 g./10 min.

Toughness has been characterized by two methods. In the first method in accordance with ASTM D638-72 toughness is defined as the work area under the stress/strain curve when testing 2 × 1 inch strip samples at a cross head speed of 20" per min. using a Instron Tensile Tester. In another method Toughness Index was determined by multiplying the average break stress by the average break elongation times $10^{-3}$ and dividing by 2. These toughness determinations are set forth in Table III.

TABLE I

| EPM TYPE | ETHYLENE CONTENT % BY WT. | PROPYLENE CONTENT % BY WT. | CRYSTALLINITY X-RAY % | DSC % | MOONEY VISCOSITY ML1 + 8 at 212° F. |
|---|---|---|---|---|---|
| A | 40 | 60 | 0 | 0 | 40 |
| B | 70 | 30 | 11 | 9 | 40 |

TABLE II

| EXAMPLE # | LDPE % | EPM TYPE | % | TENSILE PROPERTIES** MODULUS × 10⁴ psi | YIELD ST. × 10³ psi | BREAK ST. × 10³ psi | ELONG. AT BREAK % |
|---|---|---|---|---|---|---|---|
| 1 | 100 | — | — | 1.90 | 1.25 | 2.70 | 480 |
| 2 | 95 | B | 5 | 1.71 | 1.14 | 2.87 | 529 |
| 3 | 90 | B | 10 | 1.55 | 1.06 | 2.71 | 510 |
| 4 | 95 | A | 5 | 1.53 | 1.08 | 2.57 | 495 |
| 5 | 90 | A | 10 | 1.39 | 1.01 | 2.46 | 494 |

**Physical properties are averages of test pieces cut parallel and normal to extrusion direction.

TABLE III

| EXAMPLE # | LDPE % | EPM TYPE | % | TOUGHNESS LB. | TOUGHNESS INDEX IN. AVERAGE |
|---|---|---|---|---|---|
| 1 | 100 | — | — | 25.54 | 648 |
| 2 | 95 | B | 5 | 27.23 | 759 |
| 3 | 90 | B | 10 | 25.28 | 691 |
| 4 | 95 | A | 5 | 23.36 | 636 |
| 5 | 90 | A | 10 | 22.05 | 607 |

From the data in Table II, it will be noted that the Type A EPM had a greater effect on lowering the tensile properties of LDPE. On the other hand, Type B EPM had a lesser effect upon lowering tensile properties and actually improved break stress and break elongation.

From the toughness data in Table III, it will be noted that by both methods the Type B EPM improves toughness whereas, using the amorphous Type A EPM, toughness is decreased. The Instron toughness data are plotted in FIG. 1 against the concentration of EPM. It will be noted that using Type B EPM, Curve 1, the Instron toughness of the LDPE is definitely improved when between about 0.5 weight percent and about 9 weight percent of the crystalline Type B EPM as blended therewith. Also, from Curve 1 it will be noted that a preferred weight percent range of EPM concentration is between about 2 and about 8 weight percent, with a maximum improvement at about 5 weight percent. On the other hand using the completely amorphous Type A EPM the toughness, Curve 2, decreases with increasing concentration of this EPM.

Figure 2:
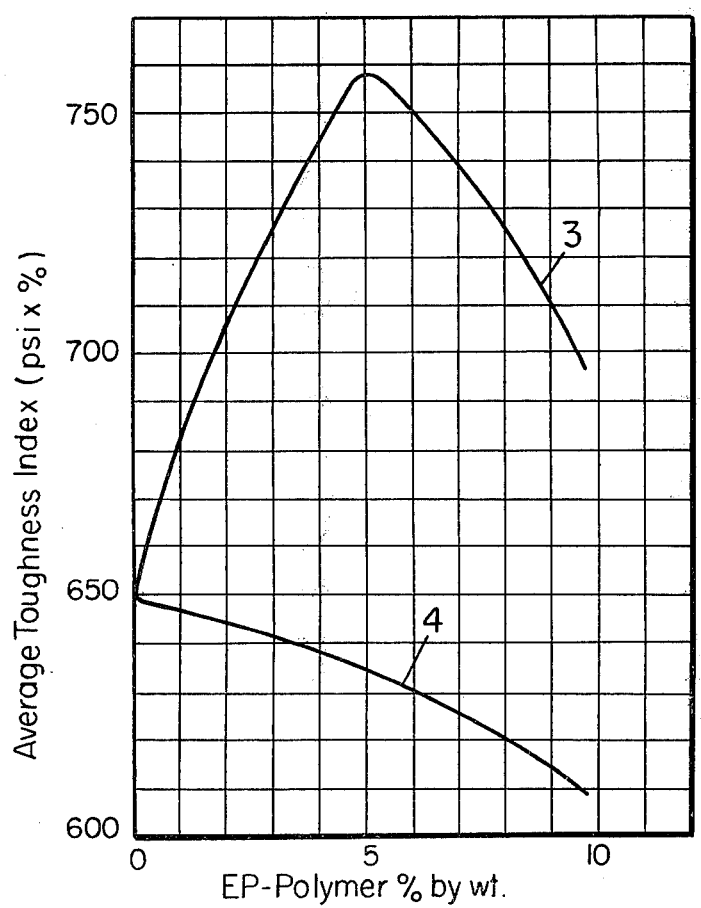
FIG. 2 presents a curve showing the relationship between Toughness Index and the concentration in LDPE of a partially crystalline ethylene-propylene copolymer and a comparative curve showing the relationship between Toughness Index and the concentration in LDPE of an amorphous ethylene-propylene copolymer.

In FIG. 2, Toughness Index data are plotted versus the concentration of EPM. With Type B EMP, Curve 3, Toughness Index is definitely improved when the concentration is between about 0.5 weight percent and about 10 weight percent. In the case of Type A EPM, Curve 4, the Toughnes Index decreased with increasing concentration.

EXAMPLE 2

The films produced as described in Example 1 were subjected to an aging test in air. This test was carried out at 40° C., i.e., below crystalline melt temperature of the Type B EPM, for 300 hours. In carrying out this determination 1.5 mil films 5 × 12 inches are kept under 500 gram pressure. "Bleed" shows up as blisters and wet contact areas between the film samples. "Semi-blocked" film means that the film only opens by hand using force. A "blocked" film cannot be opened by hand without the use of tools. The results of these determinations are set forth in Table IV.

TABLE IV

| LDPE % | EPM TYPE | % | $T_m$, °C. | AGING TEST IN AIR TEMP., °C | TIME, HRS. | BLEED | BLOCKING | APPEARANCE |
|---|---|---|---|---|---|---|---|---|
| 100 | — | — | — | 40 | 300 | None | None | Smooth |
| 95 | B | 5 | 44 | " | " | " | " | " |
| 90 | B | 10 | 44 | " | " | " | " | " |
| 95 | A | 5 | None | " | " | Slight | Semi-Blocked | Wrinkled |
| 90 | A | 10 | None | " | " | Strong | Blocked | Wrinkled |

It will be noted from Table IV that LDPE alone and blends of LDPE with the partly crystalline Type B EPM produced films which do not bleed or block. On the other hand, using blends with wholly amorphous Type A EPM bleeding occurs as well as blocking. Further, the appearance of the films is marred.

An important commercial end use of the films of this invention is in the manufacture of bags, such as trash can liners. During commercial distribution, the bags will frequently be stored in a warehouse for periods of time up to as long as a month. The summertime warehouse storage temperatures can be as high as about 70° C. It has been found that, under such severe storage conditions, films made from blends of LDPE and Type B EPM have a tendency to show heavy blocking. It has been found that this property can be overcome by the addition to the EPM and LDPE blend between about 0.5 and about 5 weight percent of finely divided inorganic filler, such as talc, calcium silicate, silica, calcium carbonate, magnesium carbonate, clays, calcium oxides, magnesium oxides, carbon black, and graphites. The filler should be sufficiently finely divided to pass completely through 325 mesh screen (U.S. Sieve Series), i.e., 44 microns particle size or lower. The filler (e.g., talc) is generally difficult to incorporate into the resin blend and, if desired, incorporation can be assisted by the use of a small amount of mineral oil. These factors are demonstrated in the following example.

EXAMPLE 3

Blends were prepared of LDPE with Type B EPM with and without the incorporation of talc, or with or without the incorporation of mineral oil, or both. These blends were blown into films of about 1.5 mils. The films were subjected to a block test in accordance with ASTM Designation D884-48. Pertinent data are set forth in Table V.

Then, the time (seconds) to failure of the seal is reported.

EXAMPLE 4

Tubular films were extruded and blown from LDPE (density 0.925; melt Index (E) 5.0 g./10 min.) and from blends of the LDPE with 2.5% and 5.0%, respectively, of the aforedescribed Type B EPM. Each film was flattened to provide 2 layers of 0.7 mil film and a heat seal was made in the transverse direction on an impulse sealer using a nominally flat wire having a crowned

TABLE V

| CONCEN. EPM % | OIL, % | TALC, % | GREEN MASTERBATCH, % | MELT INDEX (E) g./10 min | BLOCK TEST* AT 70° C. | | | | |
|---|---|---|---|---|---|---|---|---|---|
| | | | | | 0 | 5 | 10 | 15 | 30 |
| — | — | — | 3 | 2.33 | F | F | F | F | F |
| 5 | — | — | 3 | 1.94 | F | H | H | H | H |
| 5 | — | .5 | 3 | 1.84 | F | S | M | H | H |
| 5 | — | 2.5 | 3 | 1.80 | F | F | F | T | S |
| 5 | — | 5.0 | 3 | 1.77 | F | F | F | F | F |
| 5 | 2.5 | — | 3 | 2.30 | F | H | H | H | H |
| 5 | 2.5 | .5 | 3 | 2.25 | F | S | H | H | H |
| 5 | 2.5 | 2.5 | 3 | 2.26 | F | F | T | S | M |
| 5 | 2.5 | 5.0 | 3 | 2.16 | F | F | F | F | F |

*Code for Block Test
F = Free of any sign of blocking
T = Trace of Blocking
S = Slight Blocking
M = Medium Blocking
H = Heavy Blocking From Table V, it will be noted that the blend of Type B EPM in LDPE produces heavy blocking within five days. The addition of 0.5 weight percent talc reduces blocking up to 10–15 days. The addition of 2.5 weight percent talc virtually eliminates blocking for 30 days, while 5 percent talc completely eliminates blocking for 30 days. It is further noted that the use of 2.5 weight percent mineral oil in the EPM-LDPE blend does not eliminate heavy blocking. On the other hand, addition of talc along with mineral oil shows about the same pattern of concentration-performance as the blends containing no oil. The purpose, of course, of using mineral oil is primarily for making for greater ease of incorporation of talc. The green master batch used in the blends described in Table V is composed of 30% inorganic pigments consisting of rutile, lead chromate and iron (III) ferrocyanide and 70% LDPE.

When bags made from LDPE are exposed to grease or fatty organic materials (e.g., sandwich bags containing oily or greasy foods) the heat seals are prone to fail, particularly under stress. It is a discovery of this invention that the incorporation of partially crystalline EPM (Type B) into LDPE vastly improves the resistance of the heat seal to failure on exposure to grease or fatty organic materials.

The strength of a heat seal exposed to oils is evaluated as follows: A 1 inch wide strip is cut across the seal line of two layers of film. The layers are opened and the strip is suspended in a peel relation with a static load of 0.6 pounds applied to the bottom of the strip. A vegetable oil (Wesson oil) is applied to the seal area by brush.

cross-section on the side presented to the plastic surface. Samples were cut from each sealed film and subjected to the aforedescribed heat seal test. Results were as follows:

| Film Composition | | Film | Oil |
|---|---|---|---|
| LDPE, % | EPM, % | Gauge, mil | Resistance, Sec. |
| 100 | — | 0.7 | 3 |
| 97.5 | 2.5 | 0.7 | 264 |
| 95 | 5.0 | 0.7 | 1620 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Films of blends comprising low density polyethylene having a density of 0.91 to 0.925 containing, by weight of the blend, between about 0.5 percent and about 10 percent of a copolymer consisting of ethylene and propylene having an ethylene content of about 70 weight percent and an X-ray crystallinity of about 11 percent.

2. Bags prepared from the film defined in claim 1.

3. A film as defined in claim 1 containing 0.5 to 5 weight percent of a finely divided inorganic filler.

4. A film as defined in claim 1 containing 0.5 to about 5 weight percent finely divided talc.

5. Bags prepared from the film defined in claim 4.

* * * * *